Dec. 14, 1948.    C. E. VARNER    2,456,544
ANTISKID DEVICE
Filed Jan. 23, 1946
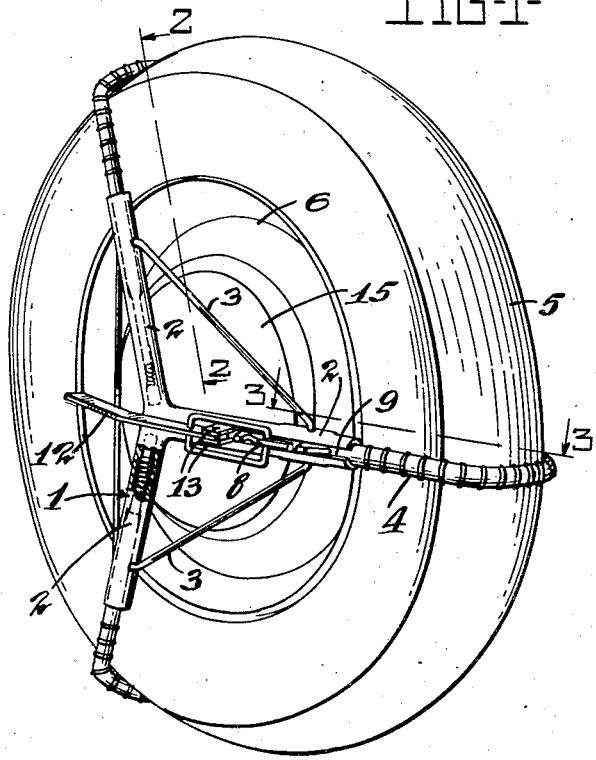
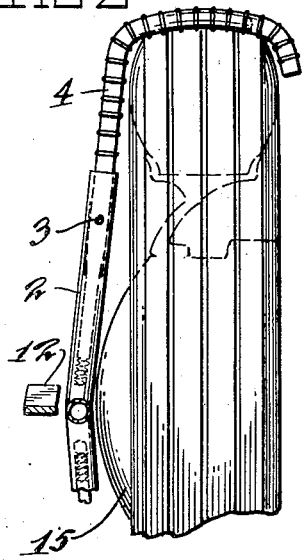
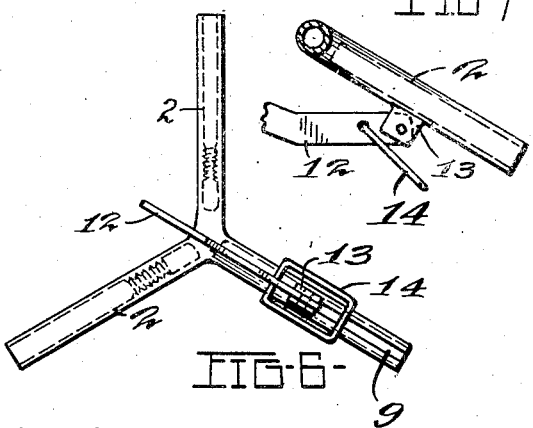
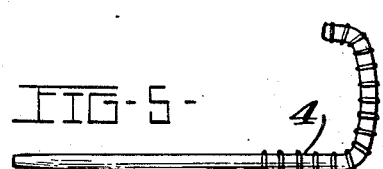
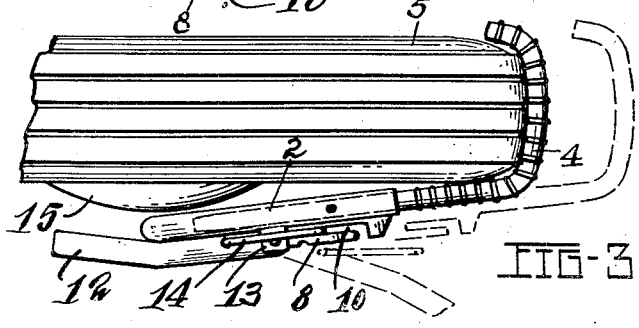
INVENTOR.
CHARLES E. VARNER,
BY
Owen & Owen
Attys.

Patented Dec. 14, 1948

2,456,544

UNITED STATES PATENT OFFICE 2,456,544

ANTISKID DEVICE

Charles E. Varner, Toledo, Ohio

Application January 23, 1946, Serial No. 642,901

3 Claims. (Cl. 152—225)

This invention relates to anti-skid devices of the type more particularly intended for use in connection with automobile wheels.

An object of the invention is the provision of a device of this character of simple and improved construction and which is capable of being easily and quickly applied to a wheel and held securely clamped thereto.

Other objects and advantages of the invention will be apparent from the following detailed description, and from the accompanying drawings illustrating one embodiment thereof, in which—

Fig. 1 is a perspective view of an anti-skid device applied to a wheel; Fig. 2 is a fragmentary edge view thereof with the device in section on the line 2—2 in Fig. 1; Fig. 3 is a similar fragmentary view with the device in section on the line 3—3 in Fig. 1; Figs. 4 and 5 are side views of different clamping members of the device; Fig. 6 is a plan of the body frame of the device, together with the lever member attached thereto, with the tire clamping members removed, and Fig. 7 is a fragmentary edge view of the frame and clamping lever.

Referring to the drawings, 1 designates the body frame of the device which, in the present instance, includes three equidistantly spaced arms 2 radiating from a central connecting point and laterally braced by connecting bars 3. Each arm 2 is hollow to telescopically receive the inner or shank end of a tire clamping member 4 which is of bar-like form with its opposite or free end portion bowed to adapt it to project over and to have hooked engagement with the tread portion of a tire 5 mounted on a wheel 6. Two of the clamping members 4 have their inner ends in threaded connection with the frame arms, preferably at the bottoms of the sockets of such arms receiving the members, thus permitting radial adjustment of the clamping members relative to the frame to suit, within limits, tires of different diameters.

The third clamping member 4 of the set is provided on its shank portion with a longitudinally extending radially projecting lug 8 which extends outwardly through a slot 9 in the outer side of the respective arm 2 and is provided at the outer side of said arm with a bayonet slot 10. One end of this slot opens radially or outwardly from the lug while its other end extends inwardly therefrom lengthwise of the lug.

A lever bar 12 is pivoted at its inner end between a pair of ears 13 projecting from the slotted arm 2 at the inner end of its slot 9 and it has a link 14 pivotally attached thereto near its inner end for engagement within the lug slot 10 through its open end when the lever is in forwardly swung position. Upon a rearward swinging movement of the lever from the position in which the link 14 is inserted in the slot 10, the link is drawn rearwardly in the slot and coacts with its inner end wall to draw the engaged member 4 inwardly and thus effect a firm clamping of the several members against the tread portion of the tire. When the lever is in clamping position it lies inwardly across the center of the body frame with the pull or line of draft of the link 14 slightly inwardly of the lever pivot. This yieldingly retains the lever in the reclining or clamping position shown in Figs. 1 and 3.

With most automobile wheels, the hub caps 15 project outwardly beyond the side plane of the tires thereof and for this reason the body frame is of outwardly dished form to adapt it to fit over the cap without inward pressure thereon or injury thereto, as shown.

In assembling the parts of the anti-skid device embodying the invention and in applying the parts of the device to a wheel, two threaded clamping members 4 are threaded into the sockets of two of the frame arms 2 until the clamping members are suitably adjusted for the size of the tire to which the device is to be applied, and after this the remaining clamping member 4, or the one provided with the lug 8, is inserted into the slotted arm 2 with its lug projecting in the slot 9. The device is then placed over a wheel with the several clamping members extending over the peripheral or tread portion of the tire, so that when an inward clamping action is applied to the members, they will be caused to firmly engage the wheel tread. This clamping action is effected by engaging the lever link 14 with the bayonet slot 10 of the adjustable clamping member when the lever is thrown outward and forward from clamping position, and then upon an inward drawing of the lever, so as to lie flat against the outer side of the frame, the connected clamping member 4 is drawn inward firmly against the tire tread. At the same time the clamping pressure of the several clamping members is substantially equalized on the tire. While the adjustable member 4 is above-described as being applied to the frame 2 before the assembling of the device on a wheel, this may be done, if desired, after the other two members have been engaged with the wheel.

An important feature of the present device resides in the fact that the clamping members 4, which are of hook shape at their outer ends to adapt them to engage over a tire, are easily turnable with respect to the frame arms 2 in which they are mounted, so as to enable the hook ends of the members to be turned into the plane of the frame to facilitate inserting between a fender and the wheel while being mounted on the latter. After the hook members in this position have been inserted between the fender and side of a tire, the hook ends may be turned to engage over the tire. This turning action of the hook members also permits traction action to turn the members on the tire so that the portions thereof in engagement with opposite sides of the tire will tend to firmly bind the tire and prevent relative slipping.

It is found in practice with this device that it can be easily and quickly applied to a wheel without jacking up the wheel and while it is deeply imbedded in mud or soft ground, thus making it extremely valuable as an accessory to be carried with the car for use in the case of emergencies such as running in mud, snow, or the like.

I wish it understood that my invention is not limited to any specific construction, arrangement or form of the parts, as it is capable of numerous modifications and changes without departing from the spirit of the claims.

Having thus described my invention, what I claim as new and desire to secure by United States Letters Patent is:

1. In an anti-skid device, a body member comprising three tubular equidistantly spaced arms open at their outer ends and rigidly secured together at their inner ends, and means connecting and bracing the arms at points outwardly spaced from their inner ends, a tire clamping member for each body arm having an inwardly projecting shank end telescoping in the respective frame arm with two of the members adjustably threaded in their arms, the outer ends of the members being of hook-form and of a shape and size to fit over a tire, the third of said members being slidingly adjustable in its arm, said last arm having a longitudinally extending side slot and the member therein having a lug projecting outwardly through said slot, a lever pivoted to the member between the slot and the center of the member and a link connection between said lever and lug whereby a movement of the lever from outwardly projecting position to reclining position across the middle of said member will effect a tightening of the arm hooks on an engaged tire, the lever being movable to a position where its pivot is outside of the line connecting the two ends of the link whereby the hooks are locked in tightened position.

2. In an anti-skid device, a body member comprising a plurality, greater than two, of tubular equidistantly spaced radial arms open at their outer ends and rigidly secured together at their inner ends, a tire clamping member for each arm having an inwardly projecting shank end telescoping in the respective arm with all of the members except one rotatably anchored therein, the outer ends of the members being of hook-form and of a size and shape for engagement over a tire and to have sidewise clamping engagement therewith when turned relative to the tire, the remaining one of said members being slidably adjustable in its arm, said last arm having a longitudinally extending side slot and the member therein having a lug projecting outwardly through said slot, a lever pivoted to the arm between the slot and the middle of the member and a link connection between said lever and lug whereby a movement of the outer end of the lever from an outwardly projecting position to reclining position across the body member will effect a tightening of the arm hooks on an engaged tire.

3. An anti-skid device comprising a body member having three outwardly opening tubular arms equally spaced in one plane, three tire engaging members, each having an outer hooked end of a shape and size to engage an automobile tire and an inwardly directed shank telescoped into one of said arms, two of said engaging members having their shanks threaded into the respective arms and the third engaging member having its shank slidable in its arm, and a quick-acting clamping device for drawing said third shank towards the center of the body member and locking it in that position.

CHARLES E. VARNER.

REFERENCES CITED

The following references are of record in the file of this patent:

UNITED STATES PATENTS

| Number | Name | Date |
| --- | --- | --- |
| 1,249,969 | Kester | Dec. 11, 1917 |
| 1,882,376 | Weber | Oct. 11, 1932 |
| 2,212,076 | Rollings | Aug. 20, 1940 |

FOREIGN PATENTS

| Number | Country | Date |
| --- | --- | --- |
| 142,298 | Austria | June 25, 1935 |